G. KLEIM.

SHEET FEEDING DEVICE FOR PRINTING MACHINES.

APPLICATION FILED DEC. 6, 1907.

Reissued Feb. 15, 1910. 13,082.

2 SHEETS—SHEET 1.

Witnesses:
E. M. Allen
G. F. Wesson

Inventor:
Gustav Kleim
By Attorneys
Luttrell & Luttrell

G. KLEIM.
SHEET FEEDING DEVICE FOR PRINTING MACHINES.
APPLICATION FILED DEC. 6, 1907.
Reissued Feb. 15, 1910. 13,082.
2 SHEETS—SHEET 2.
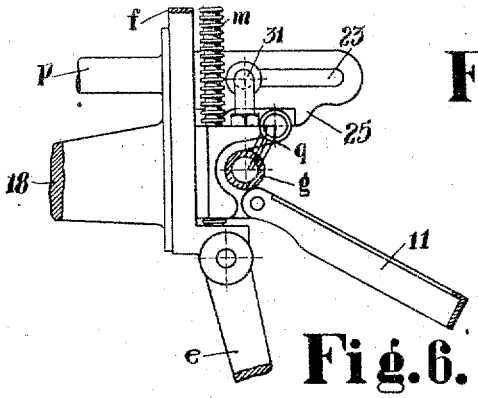
Fig. 5.
Fig. 6.
Fig. 7.
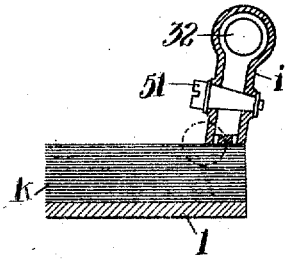
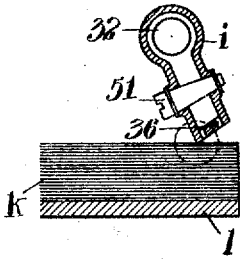
Fig. 8.
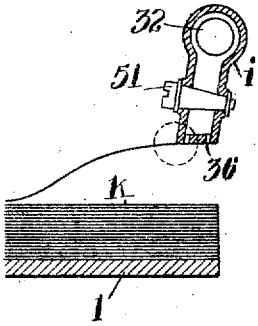
Fig. 9.
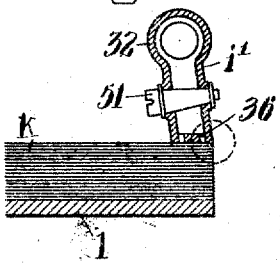
Fig. 10.
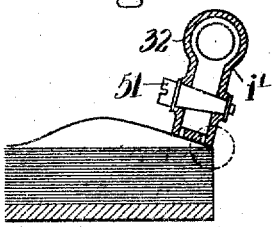
Fig. 11.
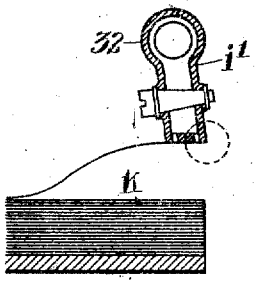
Fig. 12.
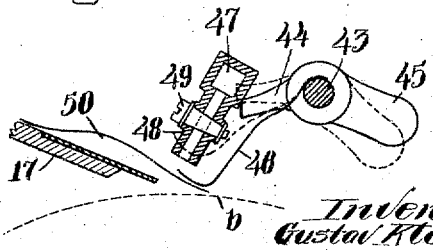
Witnesses:
E. M. Allen.
G. F. Nisson
Inventor:
Gustav Kleim.
by Attorneys
Smithgall & Smithgall

UNITED STATES PATENT OFFICE.

GUSTAV KLEIM, OF LEIPZIG, GERMANY, ASSIGNOR TO JAMES LOGAN, OF WORCESTER, MASSACHUSETTS.

SHEET-FEEDING DEVICE FOR PRINTING-MACHINES.

13,082. Specification of Reissued Letters Patent. Reissued Feb. 15, 1910.

Original No. 819,352, dated May 1, 1906, Serial No. 338,737. Application for reissue filed December 6, 1907. Serial No. 405,455.

*To all whom it may concern:*

Be it known that I, GUSTAV KLEIM, a citizen of the Empire of Germany, residing at Leipzig, in the Empire of Germany, have invented a new and useful Sheet-Feeding Device for Printing-Machines, of which the following is a specification.

Figure 1:
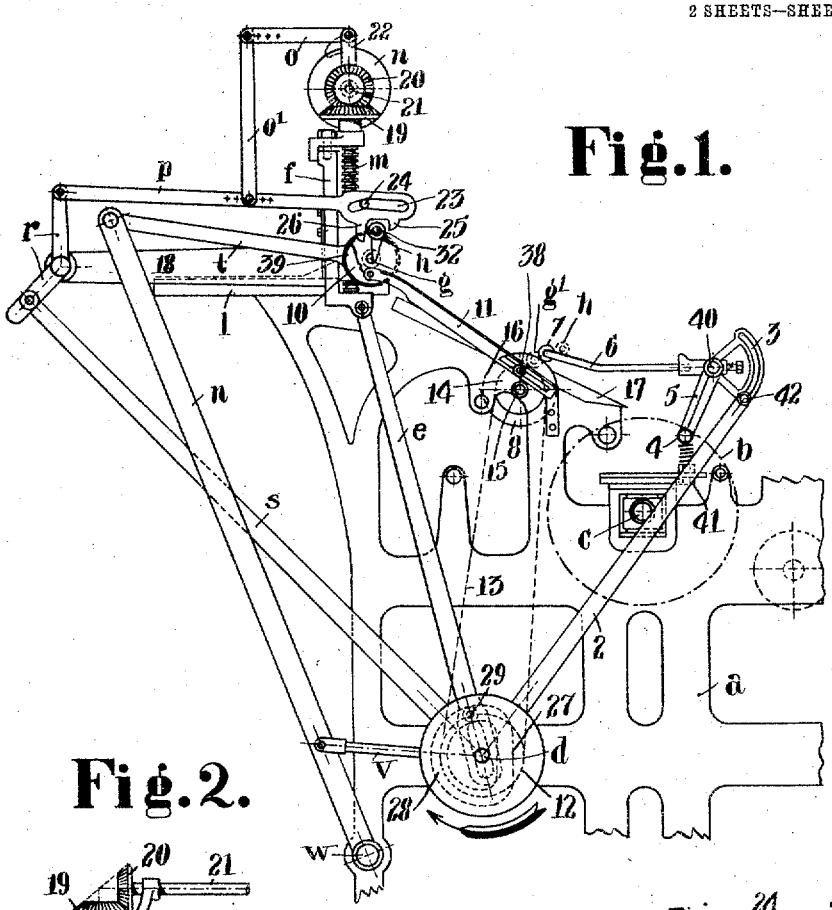
Figure 2:
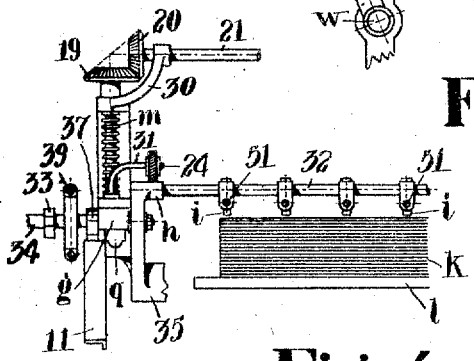
Figure 3:
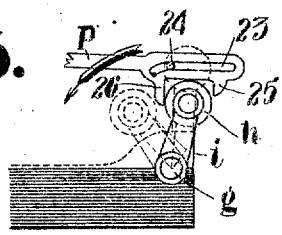
Figure 4:
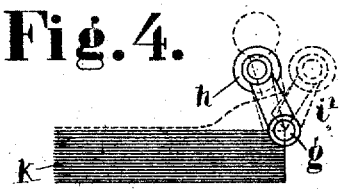

My invention relates to improvements in pneumatic sheet-feeding devices for printing-machines; and the objects of my improvement are, first, to provide a rocking pneumatic frame attached by a hose to an air-sucking device and having a plurality of sucking boxes adapted to suck the uppermost sheet; second, to provide means for so moving the rocking pneumatic frame that its several sucking-boxes first touch the front edge of the uppermost sheet, then turn the same around their edges as an axis, afterward raise this sheet edge and move the sheet through a part of the path to the printing-cylinder, whereupon the sheet is allowed to drop and the rocking pneumatic frame is returned to its initial position; third, to provide means for seizing the dropping sheet and moving it to the printing-cylinder, and, fourth, to provide means for gradually lowering the bearings holding the trunnions of the rocking pneumatic-frame in proportion to the diminishing height of the pile of sheets. I attain these objects by the mechanism illustrated in a mode of execution in the accompanying drawings, in which:

Figure 1 is a side view of a part of a printing-machine and the pneumatic sheet-feeding device attached thereto. Fig. 2 is a fractional front view of the pile of sheets and of the rocking pneumatic frame. Fig. 3 shows, on an enlarged scale, a side view of the same in which three different positions of the rocking pneumatic frame are indicated by drawn and dotted lines. Fig. 4 shows a similar side view, the rocking pneumatic frame being modified. Fig. 5 is a detail which will be referred to later on. Figs. 6, 7 and 8 show three different positions of a sucking-box arranged to turn the front edge of the uppermost sheet backward. Figs. 9, 10 and 11 show three different positions of a modified sucking-box arranged to turn the front edge of the uppermost sheet forward, and Fig. 12 is a detail which will be referred to later on.

Similar characters of reference refer to similar parts throughout the several views.

*a* denotes a part of the frame of a printing-machine of any known construction, and *b* denotes the printing-cylinder, the shaft *c* of which is mounted to turn in suitable bearings.

*d* is a shaft driven in any known manner from the main shaft of the printing-machine and at the same rate as the printing-cylinder *b*. On this shaft *d* are keyed four grooved cam-disks 27 on both sides of the machines, which are to actuate the four rods *v s e* 2.

I have shown in Fig. 1 only the front cam-disk 27 as provided with a groove 28, for the sake of clearness; but the three other cam-disks, which are preferably behind the same, are equally provided with grooves, the shapes of which can easily be ascertained by drafting when bearing in mind the kind of the motion which the groove is required to transmit to the respective rod. The lower end of the rod *e* is provided with a slot into which the shaft *d* engages, so as to guide the rod *e*. Immediately above the slot the rod *e* is provided with a pin on which a roller 29 is mounted to turn. This roller 29 engages in the groove 28, and it will now be evident that during the revolution of the shaft *d* the roller 29 is moved up and down by the groove 28 guiding the same, whereby the rod *e* is given a reciprocating motion. In a similar manner the three other rods *v*, *s* and 2 are reciprocated by their respective grooved cam-disks 27.

*l* is the table on which the pile *k* of sheets is placed. At the front edge of the table *l* two slides *f* are mounted on both sides of the machine to move vertically in suitable guides (not shown) forming parts of the frame *a*. Each slide *f* is rigidly connected with a horizontal arm 18 and is pivotally connected with the rod *e*, so that from the respective cam-disks 27 the two slides *f* with the horizontal arms 18 are moved up and down. In each slide *f* a vertical screw-spindle *m* is mounted to turn, which carries a bearing *q*, (see Fig. 5,) adapted to slide vertically on the slide *f*. On the upper ends of the two screw-spindles *m* (see also Fig. 2) are keyed two bevel-wheels 19, which engage in the bevel-wheels 20, keyed on a horizontal shaft 21. The latter is mounted to turn in suitable arms 30 of the two slides *f* and carries a friction-wheel *n*, fastened on it, and two loose arms 22, embracing the friction-wheel *n*. To the free ends of the arms 22 a lever *o* is pivotally connected, the end of which is formed as a friction-pawl to work with the periphery of the friction-wheel *n*. The other end of the lever *o* is pivotally connected by a rod *o'* to the one of two horizontal rods *p*. At the rear ends of the two arms 18 two bell-crank levers *r* are mounted to turn on suitable pins. The vertical arms of these bell-crank levers are pivotally connected with the horizontal rods *p* already mentioned above, while their lower arms are pivotally connected with the rods *s*. The right ends of the rods *p* in Fig. 1 are each provided with a slot 23, which is for the most part horizontal and on the left end curved downward. Into these slots 23 of the two rods *p* two pins 24 engage for guiding the rods *p*. The two pins 24 form the ends of two bent rods 31, (see Figs. 2 and 5,) screwed into the top faces of the two bearings *q*. On the lower surface the slotted ends of the rods *p* are provided with two downwardly-projecting arms 25 and 26 of unequal lengths, so as to form two forks.

The rocking pneumatic frame consists of a tube 32, made in one piece with several sucking-boxes *i*, *i*; further, of two end pieces *h*, attached to the two ends of the tube 32; finally of two trunnions *g*, secured in the two end pieces *h*. The one end piece *h* and the adjoining trunnions *g* (see Fig. 2) are made hollow, and the latter is so connected with a hose 34 by means of a coupling 33 that the whole pneumatic frame is allowed to rock through a convenient angle around the axis of the two trunnions *g*. Preferably this frame is balanced by two counterweights 35. The bottoms of the several sucking-boxes *i i* are each provided with several perforations 36—36, and the whole frame is so made that the several sucking-boxes *i i* communicate, by means of the tube 32, the hollow end piece *h*, and the hollow trunnion *g*, with the hose 34. This hose 34 is connected with an air-sucking device (not shown) arranged on some convenient place of the printing-machine. The construction of the air-sucking device is immaterial and may be of any known kind. The printing machine is further provided with means, of any known construction, which so control the air-sucking device that the latter produces a vacuum in the pneumatic frame at a certain moment during each revolution of the printing-cylinder and that this vacuum is again removed by admitting air at another certain moment.

On both trunnions *g* of the pneumatic frame two rollers 37 are mounted to turn, which are adapted to roll on the top wings of two rods 11, made of angle-iron. The upper ends of the two rods 11 are hinged to the two bearings *q*, (see Figs. 2 and 5) while their lower ends are slotted and guided by two pins 38, engaging in their slots and secured on the machine-frame *a*. It will be evident that the two rods 11 partake in the vertical motion of the two bearings *q*. On the two trunnions *g* of the pneumatic frame are further fastened two circular friction-disks 10, (see Fig. 1,) which are embraced by two rings 39, made each in two parts and forming the ends of two rods *t*. The latter are pivotally connected with two levers *n*, turning on the pins *w* at the machine-frame *a*. The two levers *n* in turn are pivotally connected with the two rods *v* already mentioned above. The respective grooved cam-disks 27, actuating the rods *v*, are so shaped as to move the trunnions *g* of the penumatic frame from their normal positions in the bearings *q* to their other extreme positions, (marked by *g'* in Fig. 1.) The two bearings *q* (see Fig. 5) are so hollowed or curved as to allow the trunnions *g* of the pneumatic frame to easily engage in and again get out of the bearings. The top wings of the two rods 11 are so cut out near the upper ends (see Figs. 2 and 5) as to enable the two rollers 37 to easily get on them.

The sucking-boxes *i—i* are so formed that their left bottom edges (see Figs. 3 and 6 to 8) are exactly in the axis of the two trunnions. They assume the positions shown at Fig. 6, when their bottoms are lightly pressed on the pile *k* of sheets at the front edge. When a vacuum is produced in the sucking-boxes *i—i* in the manner described above, the uppermost sheet will be sucked and pressed so firmly against the bottoms of the sucking-boxes that on turning the pneumatic frame backward (see Fig. 7) the front edge of the sheet will be turned upward and that on raising and simultaneously turning the pneumatic frame forward (see Fig. 8) the uppermost sheet will be safely detached from the pile *k*. This rocking motion of the pneumatic frame is produced by the forked ends of the two rods *p*. On examining Figs. 1, 2 and 3 it will be noticed that the two projections 25 and 26 on each rod *p* embrace the boss of the respective end piece *h*, in which the tube 32 is secured. When by the respective cam-disks 27 and the parts *s*, *r* the rods *p* are moved from right to left, their forked ends are lowered into the proper positions for engaging the bosses of the end pieces *h* the moment the pins 24 get from the downwardly curved parts to the horizontal parts of the slots 23, when henceforward the projections 25 will take the bosses of the end pieces *h* along with them, and thereby turn the pneumatic frame backward around the axis of the trunnions *g*. When the rods *p* are again moved from left to right—*i. e.*, forward—their projections 26 will take the bosses of the end pieces *h* along with them, and thereby turn the pneumatic frame forward. When at last the pins 24 get into the curved parts of the slots 24, the rods *p* will be thereby raised so much as to allow the pneumatic frame to get out of the bearings *q*, the bosses of its end pieces *h* moving past the short projections 25. It is also evident that the upward-and-downward motion of the rods *p*, caused by the curved parts of the slots 23, will at the same time actuate the rod *o'* and the lever *o*, so that during the downward motion of the lever *o* its end serving as a friction-pawl will take along with it the friction-wheel *n*, whereby the bearings *q* will be fed downward—*i. e.*, lowered—through the thickness of one sheet. Of course the rod *p*, connected with the rod *o'*, may be provided with several holes and also the lever *o* for adjusting the feed of the bearings *q* according to the varying thickness of the sheets to be printed. It is evident that the downward motion of the bearings *q* will have no influence upon the correct working of the friction-wheel *n* and the pawl engaging therewith, as the two loose arms 22 will be merely turned a little further on the shaft 21.

Where so preferred, the pneumatic frame may be arranged for turning forward the sucked front edge of the uppermost sheet, as is indicated by Figs. 9 to 11, which require no further explanation. The sucking-boxes *i'* are then slightly modified, as is clearly shown at Figs. 9 to 11, and the slots 23 of the rods *p* are so modified that their curved parts are on the right, and, further, the cam-disks 27 are so arranged that the rods *p* are first moved from left to right and then in the opposite direction to rock the pneumatic frame.

Beneath the inclined table 17 a shaft 15 is mounted to turn in the machine-frame *a* and driven from the shaft *d* by means of two belt-pulleys 12—14 and a belt 13. On the shaft 15 are fastened several pulleys 16, which project a little through corresponding slots in the inclined table 17 and serve in conjunction with as many rollers 7 for feeding the sheet to the printing cylinder *b*. Preferably the peripheral velocity of the pulleys 16 is made like the speed of the sheet traveling with the pneumatic frame. The rollers 7 are mounted to turn on pins in the forked ends of the levers 6. The other ends of these levers 6 are fastened by means of set-screws on a horizontal shaft 40. The latter is rigidly connected with two levers 5, which swing around two pins 4 on the upper ends of two adjusting-screws 41, secured in the covers of the bearings of the printing-cylinder *b*. On the shaft 40 two slotted segments 3 are fastened, so that all the parts 5, 3, 40, 6, with the rollers 7, can rock about the axis of the two pins 4. The segments 3 are pivotally connected with the two rods 2 by means of adjustable pins 42 engaging in their slots. The free ends of the several levers 6, with the rollers 7, engage beneath the tube 32 and between the sucking boxes *i*—*i* when the pneumatic frame occupies its extreme lower position as shown by dotted lines in Fig. 1. The respective two cam-disks 27 for actuating the two rods 2 are so arranged as to rock the levers 5 and 6 but a little without the levers 6 striking against the tube 32 and to press the rollers 7 sufficiently on the pulleys 16 for seizing and feeding the sheet to the printing-cylinder *b*.

The pneumatic sheet-feeding device described so far is operated as follows: The pile *k* of sheets is placed on the table *l*, and by properly turning the shaft 21 with the aid of a hand-crank (not shown) the two bearings *q* are first raised to allow of the pile *k* passing beneath the sucking-boxes *i*—*i*, and then so adjusted that in the lowest position of the two slides *f* the bottoms of the sucking-boxes *i*—*i* sufficiently bear on the front edge of the uppermost sheet. (See Fig. 6.) Then the printing-machine is started. By the two external cam-disks 27 the two slides *f* are raised and at the proper moment lowered, so that the sucking-boxes *i*—*i* bear on the pile *k*, when a vacuum is produced in the pneumatic frame by the air-sucking device. Now by the respective two cam-disks 27 the two rods *p* are moved from right to left to turn the pneumatic frame with the front edge of the uppermost sheet backward, Fig. 7. Hereafter the two frames *f* are again raised, and at the same time the two rods *p* are moved from left to right, so that the pneumatic frame is not only raised and turned forward to detach the uppermost sheet from the pile *k*, but also at last disengaged from the forked ends of the two rods *p*. The pneumatic frame is, however, prevented from turning inadvertently by the friction between its two disks 10 and the rings 39 at the ends of the rods *t*. At this moment, by the respective two cam-disks 27, the two rods *t* are moved from left to right in Fig. 1—*i. e.*, forward—so as to bring the trunnions *g* of the pneumatic frame down the inclined rods 11 to the other extreme position, as indicated in dotted lines. Thus the rollers 7, which are raised by the respective two cam-disks 27, reach beneath the tube 32 and above the front edge of the sheet. At this moment the vacuum is removed from the pneumatic frame by the means controlling the air-sucking device, when the front edge of the sheet will drop on the pulleys 16, and immediately afterward the rollers 7 are pressed on the sheet and the pulleys 16, so that the sheet is further fed forward to the printing-cylinder *b*, which, in a well-known manner, is arranged for seizing and carrying with it the sheet. Meanwhile the pneumatic frame is returned to the bearings *q* by the two rods *t*, whereupon the whole series of occurrences described will be repeated.

From an examination of Figs. 6 to 8, or 9 to 11 it will be evident that the rocking pneumatic frame is far superior to the ordinary rolling sucking-tubes. It is the rocking motion of the sucking-boxes *i*—*i* (or *i'*—*i'*) around their edges in the axis of the pneumatic frame which will insure the detachment of only the uppermost sheet with perfect safety, as the next lower sheets will be prevented from following the uppermost sheet by the friction between them, and their front edges are also prevented from turning in either direction by the natural stiffness of the paper, although it may be little. Therefore the speed of the rocking motion of the pneumatic frame can be made so large as to enable the feeding device to feed even high-speed printing machines.

It is a special advantage that the sheet being fed can be transported at a comparatively moderate speed from the pile *k* to the printing-cylinder *b* without its front edge bending and without the moving parts of the feeding device receiving too dangerous a speed or too great a live force. The reason for this is that the pneumatic frame need only be moved through a part of the path of the sheet, whereupon it is at once returned to its initial position, while the rollers are engaged to seize and carry farther the sheet. It depends upon the speed of the printing-machine through what part of the path of the sheet the pneumatic frame should travel. The higher the speed of the printing-machine the longer is this part of the path of the sheet, or, in other words, the path of the pneumatic frame, will have to be reduced to avoid too great a live force of the moving parts. It will be noticed that the normal radial position of the sucking boxes is shown in Fig. 8, wherein the flat lower faces of the same are practically parallel with the forward movement, the sucking boxes being held in this position by the counter-weights 35 so that when the sheet is carried forward, the same is moved practically in its plane. In other words, the crease which separates the top sheet from the pile, as shown in Fig. 7, is bent out before the sheet is carried forward. This result is obtained as the sucking boxes make their return oscillation to normal position as the same are lifted vertically from the position shown in Fig. 7 to the position shown in Fig. 8. In cases, however, where the speed of the printing-machine is not so high, the pneumatic frame may be moved through the entire path of the sheet, in which case the rollers 7, with the parts 6, 40, 5, 4, 3 and 2, with the respective two cam-disks 27, are dispensed with. In this case a device illustrated at Fig. 12 is arranged above the printing-cylinder *b* for seizing the dropping front edge of the sheet. This device consists of a shaft 43, mounted to turn in suitable bearings (not shown) on the two side parts of the machine-frame *a*. On this shaft 43 one or two weighted levers 44 are fastened, which normally assume the position indicated by the dotted lines, their weights 45 resting on some supports. (Not shown.) Several bent springs 46 are fastened on the shaft 43 and adapted to engage beneath the tube 47 and between the sucking-boxes 48 of the pneumatic frame. It is now evident that on the pneumatic frame attaining its extreme lower position its tube 47 will strike against the weighted levers 44, and thereby turn the several springs 46 downward into the positions indicated by the drawn lines. This is effected at the moment when the vacuum is removed from the pneumatic frame and the front edge of the sheet 50 drops, whereupon it will be pressed by the springs 46 on the printing-cylinder, which by its well-known means seizes and carries with it the sheet. For adjusting the pneumatic device to the varying width of the sheets to be printed its several sucking-boxes *i*—*i* are preferably provided with cocks 51—51, Fig. 2, similar to those, 49, in Fig. 12. Then either external suck-box *i* can be disconnected from the tube 32 should is be required by the smaller width of the sheet.

The pneumatic sheet-feeding device can be adapted to any ordinary printing-machine. It can be varied in many respects without deviating from the spirit of my invention. The sucking-boxes of the pneumatic frame may have the shape of those 48. (Shown at Fig. 12.)

What I claim as my invention, and desire to secure by Letters Patent, is:—

1. In a pneumatic sheet feeding device, the combination of a plurality of sucking boxes, means for effecting a relative lowering and raising action between the same and a pile of sheets, and means for turning the sucking boxes arranged so that they will turn to bend the edge of the engaged sheet at an angle after they engage said sheet and so that they will return to normal position simultaneously with the raising of the engaged sheet.

2. In a pneumatic sheet feeding device, the combination of a plurality of sucking boxes, means for effecting a relative lowering and raising action between the same and a pile of sheets, means for turning the sucking boxes arranged so that they will turn to bend the edge of the engaged sheet at an angle after they engage said sheet and so that they will return to normal position simultaneously with the raising of the engaged sheet, and means for moving the sucking boxes forward and backward relatively to the pile of sheets.

3. In a pneumatic sheet feeding device, the combination of a plurality of sucking-boxes, means for effecting engagement between the same and a pile of sheets, means for turning the sucking-boxes arranged so that they will turn to bend the edge of the engaged sheet at an angle after they engage said sheet and so that they will thereafter return to normal position, and means for moving said sucking boxes forward and backward relatively to the pile of sheets, said forward action taking place with the sucking-boxes in their normal position.

4. In a pneumatic sheet feeding device, the combination of a plurality of sucking-boxes, means for effecting engagement between the same and a pile of sheets, means for turning the sucking-boxes to bend the end of the engaged sheet at an angle and to return to normal position, means for moving the sucking-boxes forward and backward, and means for holding the sucking-boxes in normal position during the forwarding action.

5. In a pneumatic sheet feeding device, the combination of a plurality of sucking-boxes, means for effecting engagement between the same and a pile of sheets, means for turning the sucking boxes so that they will bend the end of the engaged sheet at an angle and return to normal position, means for moving the sucking-boxes forward and backward, and means for disengaging the turning means during the forward and backward movement of the sucking-boxes.

6. In a pneumatic sheet-feeding device for printing-machines, the combination with a horizontal tube provided with a plurality of dependent boxes for sucking the uppermost sheet, said horizontal tube being adapted to turn on the edges of the sucking-boxes in an axis parallel to it, means for connecting said horizontal tube with an air-sucking device, two open bearings for the axis of said horizontal tube, means for feeding said two open bearings down with reference to the axis through the thickness of one sheet to be printed during each revolution of the printing-cylinder, means for moving said two open bearings vertically, means for reciprocating said horizontal tube around its axis during the vertical motion of said two open bearings, an inclined table hinged to said two open bearings and adjoining to the printing-cylinder, means for moving the axis of said horizontal tube out of said two open bearings down said inclined table and vice versa, and means for seizing the front edge of the sheet and delivering it to the printing-cylinder.

7. In a pneumatic sheet-feeding device for printing-machines, the combination with two vertical guides on both sides of the machine-frame, two slides moving in said two vertical guides and provided each with a vertical screw-spindle, means for moving said two slides up and down, two bearings open on one side and adapted to slide in said two slides and engaging said two screw-spindles, means for turning said two screw-spindles, to feed said two bearings downward through the thickness of one sheet to be printed during each rotation of the printing-cylinder, two trunnions adapted to turn in said two bearings and provided with two arms, a horizontal tube secured in the free ends of the two arms of said two bearings and provided with a plurality of dependent boxes for sucking the front edge of the uppermost sheet, one of said two trunnions and its arm being hollow to communicate with the horizontal tube and the sucking-boxes and the pneumatic frame formed thereby being so arranged, that the bottom edges of said sucking-boxes on one side are in the axis of the two trunnions, means for connecting the hollow trunnion of said pneumatic frame with an air-sucking device, means for rocking said pneumatic frame during the vertical motion of said two slides and releasing same in the one extreme position, an inclined table leading to the printing-cylinder, two inclined rails hinged at the upper ends to said two bearings and guided at the lower ends by two pins on the machine-frame, means for moving the trunnions of said pneumatic frame when released out of said two bearings down said two inclined rails and vice versa, and means for seizing the front edge of the sheet released by said sucking-boxes and delivering it up to the printing-cylinder.

8. In a pneumatic sheet-feeding device for printing-machines, the combination with two vertical guides on both sides of the machine-frame at the front of the sheet-piling table, two slides moving in said two vertical guides and provided each with an arm and a vertical screw-spindle with a bevel-wheel on the upper end, two bearings open on one side and adapted to slide in said two slides and engaging said two screw-spindles, a horizontal shaft mounted to turn in the arms of said two slides, two bevel-wheels on said horizontal shaft and engaging in the two bevel-wheels on said two screw-spindles, a friction-wheel on said horizontal shaft, means for moving said friction-wheel to feed said two bearings downward through the thickness of one sheet to be printed during each rotation of the printing-cylinder, a pneumatic frame formed of two trunnions adapted to turn in said two bearings, two arms connected with these trunnions, a horizontal tube secured in the free ends of these two arms and a plurality of dependent boxes integral with the horizontal tube, said dependent boxes being adapted to suck the uppermost sheet and having their bottom edges on one side in the axis of the pneumatic frame, the one trunnion and arm of said pneumatic frame being hollow to communicate with the horizontal tube, means for connecting the hollow trunnion of said pneumatic frame with an air-sucking device, two bell-crank levers mounted to rock on said two slides, two horizontal rods pivotally connected with the upper arms of said two bell-crank levers and provided on the front ends each with a slot and two dependent projections, the dependent projections of said two horizontal rods being adapted to engage the horizontal tube of said pneumatic frame and thereby to rock the latter, said two bearings being provided with two pins engaging in the slots of said two horizontal rods for so guiding them, that in their one extreme position they release said pneumatic frame, an inclined table leading from the sheet-piling table to the printing-cylinder, two inclined rails hinged at the upper ends to said two bearings and guided at the lower ends by two pins on the machine-frame, a horizontal pulley-shaft mounted to turn in the machine-frame beneath said inclined table, a plurality of pulleys fastened on said horizontal pulley-shaft and just projecting through slots in said inclined table, a rocking frame mounted above the printing-cylinder to turn on two pins at the side parts of the machine-frame, means mounted to turn in said rocking frame and adapted to work with said pulleys for seizing the sheet and moving it to the printing-cylinder, two friction-disks on the trunnions of said pneumatic frame, two eyed rods adapted to embrace with their eyed ends said two friction-disks, two rear levers mounted to swing on pins at the machine-frame and pivotally connected at their free ends with said two eyed rods, a lower shaft mounted to turn in the machine-frame and driven at the same rate as the printing-cylinder, means for transmitting the rotation from said lower shaft to said horizontal pulley-shaft, means fastened on said lower shaft of the machine, a plurality of radial rods engaging at their lower ends the means fastened to said lower shaft the upper ends of said radial rods being pivotally connected with said two rear levers, said two slides, said rocking frame and the lower arms of said two bell-crank levers respectively.

9. In a pneumatic sheet-feeding device for printing-machines, the combination with a horizontal tube provided with a plurality of dependent boxes for sucking the uppermost sheet, said horizontal tube being adapted to turn on the edges of the sucking-boxes in an axis parallel to it, means for connecting said horizontal tube with an air-sucking device, two open bearings for the axis of said horizontal tube, means for feeding said two open bearings down through the thickness of one sheet to be printed during each revolution of the printing-cylinder, means for moving said two open bearings vertically, means for reciprocating said horizontal tube around its axis during the vertical motion of said two open bearings, and means for engaging and transferring each sheet to printing mechanism.

10. In a pneumatic sheet-feeding device for printing-machines, the combination with two vertical guides on both sides of the machine-frame, two slides moving in said two vertical guides and provided each with a vertical screw-spindle, means for moving said two slides up and down, two bearings open on one side and adapted to slide in said two slides and engaging said two screw-spindles, means for turning said two screw-spindles to feed said two bearings downward through the thickness of one sheet to be printed during each rotation of the printing-cylinder, two trunnions adapted to turn in said two bearings and provided with two arms, a horizontal tube secured in the free ends of the two arms of said two trunnions and provided with a plurality of dependent boxes for sucking the front edge of the uppermost sheet, one of said two trunnions and its arm being hollow to communicate with the horizontal tube and the sucking-boxes and the pneumatic frame formed thereby being so arranged, that the bottom edges of said sucking-boxes on one side are in the axis of the two trunnions, means for connecting the hollow trunnion of said pneumatic frame with an air-sucking device, means for rocking said pneumatic frame during the vertical motion of said two slides and releasing same in the one extreme position, and means for engaging and transferring each sheet to printing mechanism.

11. In a pneumatic sheet-feeding device for printing-machines, the combination with two vertical guides on both sides of the machine-frame at the front of the sheet-piling table, two slides moving in said two vertical guides and provided each with an arm and a vertical screw-spindle with a bevel-wheel on the upper end, two bearings open on one side and adapted to slide in said two slides and engaging said two screw-spindles, a horizontal shaft mounted to turn in the arms of said two slides, two bevel-wheels on said horizontal shaft and engaging in the two bevel-wheels on said two screw-spindles, a friction-wheel on said horizontal shaft, means for moving said friction-wheel to feed said two bearings downward through the thickness of one sheet to be printed during each rotation of the printing-cylinder, a pneumatic frame formed of two trunnions adapted to turn in said two bearings, two arms connected with these trunnions, a horizontal tube secured in the free ends of these two arms and a plurality of dependent boxes integral with the horizontal tube, said dependent boxes being adapted to suck the uppermost sheet and having their bottom edges on one side in the axis of the pneumatic frame, the one trunnion and arm of said pneumatic frame being hollow to communicate with the horizontal tube, means for connecting the hollow trunnion of said pneumatic frame with an air-sucking device, two bell-crank levers mounted to rock on said two slides, two horizontal rods pivotally connected with the upper arms of said two bell-crank levers and provided on the front ends each with a slot and two dependent projections, the dependent projections of said two horizontal rods being adapted to engage the horizontal tube of said pneumatic frame and thereby to rock the latter, said two bearings being provided with two pins engaging in the slots of said two horizontal rods for so guiding them, that in their one extreme position they release said pneumatic frame, and means for engaging and feeding each sheet to printing mechanism.

In testimony whereof I have signed my name to this specification in the presence of two subscribing witnesses.

GUSTAV KLEIM.

Witnesses:

HEINRICH HENNINGS, JR.
RUDOLPH FRICKE.